United States Patent
Remany et al.

(10) Patent No.: US 7,721,289 B2
(45) Date of Patent: May 18, 2010

(54) SYSTEM AND METHOD FOR DYNAMIC ALLOCATION OF COMPUTERS IN RESPONSE TO REQUESTS

(75) Inventors: Venkata S. S. Remany, Bellevue, WA (US); Hari S. Narayan, Bellevue, WA (US); Sivaprasad Padisetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1726 days.

(21) Appl. No.: 10/652,274

(22) Filed: Aug. 29, 2003

(65) Prior Publication Data

US 2005/0050546 A1  Mar. 3, 2005

(51) Int. Cl.
G06F 9/46  (2006.01)
G06F 11/00  (2006.01)

(52) U.S. Cl. .................................. 718/104; 714/25

(58) Field of Classification Search ............... 718/102, 718/104, 100, 1; 709/229, 220, 203; 714/25
See application file for complete search history.

(56) References Cited

U.S. PATENT DOCUMENTS

| | | | | |
|---|---|---|---|---|
| 4,179,735 A * | 12/1979 | Lodi | ........................ | 713/100 |
| 5,379,412 A | 1/1995 | Eastridge et al. | | |
| 5,487,168 A * | 1/1996 | Geiner et al. | .................. | 705/8 |
| 5,499,354 A | 3/1996 | Aschoff et al. | | |
| 5,555,375 A * | 9/1996 | Sudama et al. | .............. | 709/226 |
| 5,682,530 A * | 10/1997 | Shimamura | ................. | 718/104 |
| 6,014,760 A * | 1/2000 | Silva et al. | .................... | 714/46 |
| 6,029,257 A * | 2/2000 | Palmer | ........................ | 714/40 |
| 6,085,193 A * | 7/2000 | Malkin et al. | ................. | 707/10 |
| 6,094,531 A * | 7/2000 | Allison et al. | ............... | 717/176 |
| 6,223,267 B1 | 4/2001 | Hodges et al. | | |
| 6,301,616 B1 * | 10/2001 | Pal et al. | ..................... | 709/226 |
| 6,507,902 B1 | 1/2003 | Hodges et al. | | |
| 6,604,174 B1 | 8/2003 | Dean et al. | | |
| 6,662,217 B1 * | 12/2003 | Godfrey et al. | ............. | 709/219 |
| 6,662,219 B1 * | 12/2003 | Nishanov et al. | ............ | 709/220 |
| 6,804,709 B2 * | 10/2004 | Manjure et al. | ............. | 709/220 |
| 6,810,364 B2 * | 10/2004 | Conan et al. | ................ | 702/188 |
| 6,882,951 B2 * | 4/2005 | Eden et al. | .................. | 702/121 |
| 6,920,148 B1 * | 7/2005 | Kato | ......................... | 370/442 |
| 6,941,109 B2 * | 9/2005 | Matsushita et al. | ......... | 455/13.2 |

(Continued)

FOREIGN PATENT DOCUMENTS

EP  986216 A2 *  3/2000

*Primary Examiner*—Meng-Ai An
*Assistant Examiner*—Caroline Arcos
(74) *Attorney, Agent, or Firm*—Wolf, Greenfield & Sacks, P.C.

(57) ABSTRACT

A mechanism dynamically allocates physical machines (computers) for satisfying requests for the machines, such as in the context of assigning test machines for running test cases. Each request specifies one or more logical machine sets it needs, and each logical machine set has specified requirements. The physical machines are organized into a hierarchical structure that includes groups and subgroups of machines. An allocation engine performs the function of allocating available machines from a selected group in the hierarchy for a request based on the requirements of each logical machine set of the request. A group or subgroup of machines may be marked as "allocate as one unit" and all machines in it will be reserved for one request. A job corresponding to a request may have sub-jobs, and machines allocated for the sub-job are selected from the machines allocated for the parent job.

10 Claims, 8 Drawing Sheets

U.S. PATENT DOCUMENTS

| | | | |
|---|---|---|---|
| 7,055,137 B2* | 5/2006 | Mathews | 717/125 |
| 7,089,017 B2* | 8/2006 | Chen et al. | 455/453 |
| 7,242,809 B2* | 7/2007 | Hunter et al. | 382/224 |
| 7,321,926 B1* | 1/2008 | Zhang et al. | 709/220 |
| 2002/0059427 A1* | 5/2002 | Tamaki et al. | 709/226 |
| 2002/0116507 A1* | 8/2002 | Manjure et al. | 709/229 |
| 2003/0074606 A1* | 4/2003 | Boker | 714/42 |
| 2003/0149765 A1* | 8/2003 | Hubbard et al. | 709/224 |
| 2004/0019659 A1* | 1/2004 | Sadot et al. | 709/219 |
| 2004/0236728 A1* | 11/2004 | Newman et al. | 707/3 |

* cited by examiner

SYSTEM AND METHOD FOR DYNAMIC ALLOCATION OF COMPUTERS IN RESPONSE TO REQUESTS

TECHNICAL FIELD

This invention relates generally to computer networks, and more particularly to a framework that is capable of dynamic allocation of computers to meet a large number of requests, such as in the case of allocating test machines for running different test cases.

BACKGROUND OF THE INVENTION

Allocation of computer resources to meet different requests can be a very difficult task, especially when there are many variables to be considered in matching the resources with the requests. For instance, in the context of automated testing of computer software and hardware, there may be hundreds of test requests and thousands of test computers to be assigned to the tests. In this context, the test machines are the resources to be allocated. The test requests may ask for different numbers of test machines with different specified configurations, and each test request has to be satisfied by allocating the required number of computers with the specified configurations from the pool of available test machines. The sheer numbers of the test requests and test machines can make the cross-matching of the requests and the available physical machines a daunting task. Moreover, the dynamic nature of the availability of the testing machines further increases the complexity of the resource allocation operation, as the test machines may be currently used for running test cases or being released from test cases and becoming available to run other test cases$_{[VR1]}$. The dynamic nature of the constantly changing machine configurations also has to be taken into consideration. For instance, a machine may have a different operating system installed on it after a test run.

SUMMARY OF THE INVENTION

In view of the foregoing, the present invention provides a mechanism for dynamically allocating available physical machines (computers) for satisfying different requests for the machines. Each request specifies one or more logical machine sets it needs, and each logical machine set has specified requirements. In accordance with the invention, the physical machines are organized into a hierarchical structure that includes groups of machines, and each group may include multiple individual machines and subgroups of machines. An allocation engine performs the function of allocating available machines from a selected target group in the hierarchy for a request based on the requirements of each logical machine set of the request. A group or subgroup of machines may be marked as "allocate as one unit" and all machines in it will be reserved for one request. A job corresponding to a request may have sub-jobs, and machines allocated for a sub-job are selected from the machines allocated for the parent job.

DETAILED DESCRIPTION OF THE INVENTION

Figure 1:
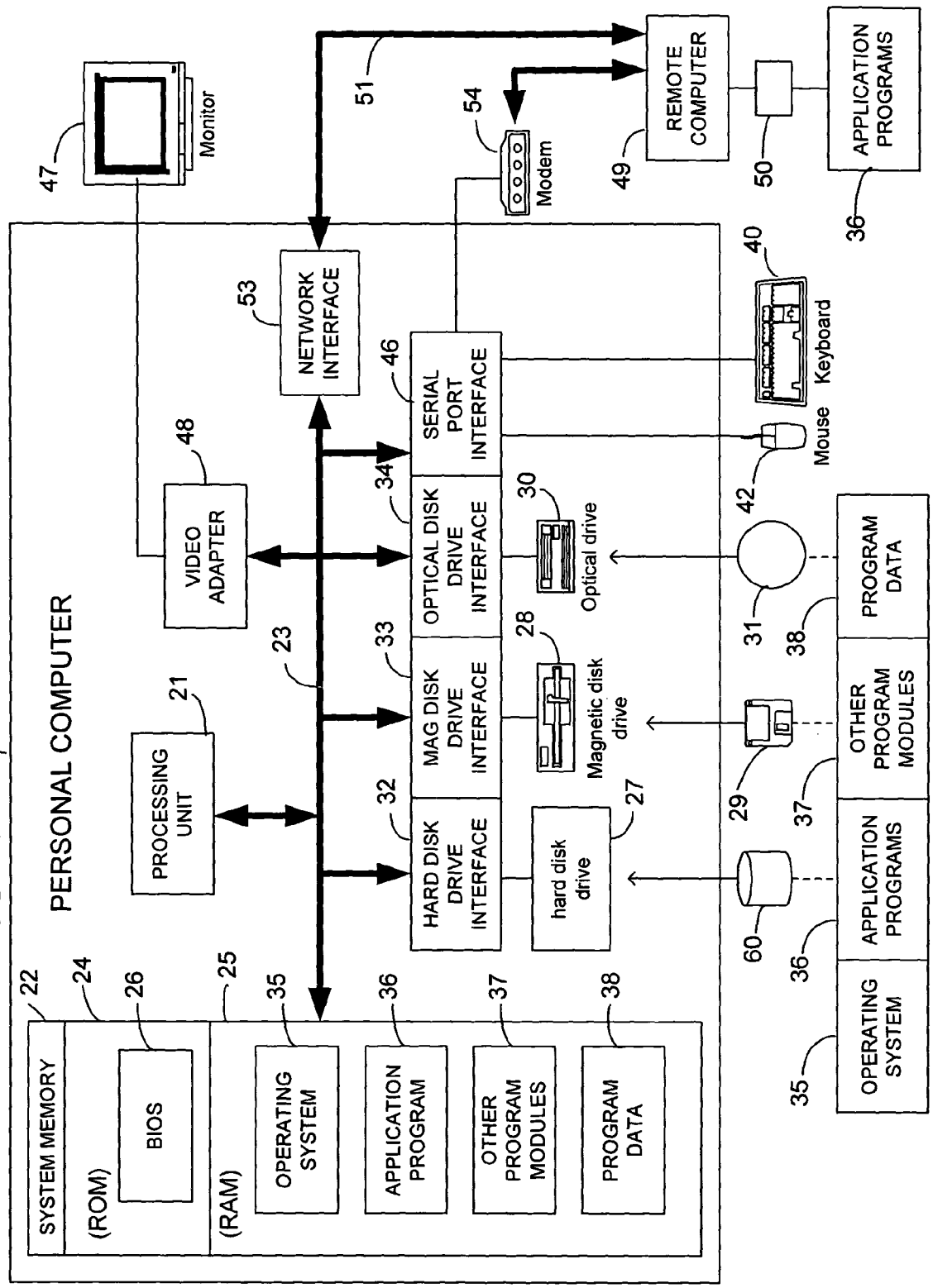
FIG. 1 is a block diagram generally illustrating an exemplary computer system on which an embodiment of an allocation engine for allocating physical machines to different requests for machines in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are distributed computing environment, program modules may be located in both local and remote memory storage devices.

The following description begins with a description of a general-purpose computing device that may implement an allocation mechanism for allocating computing machines in response to different requests to use the machines. The allocation mechanism of the invention will be described in greater detail with reference to FIGS. 2-8. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

Figure 2:
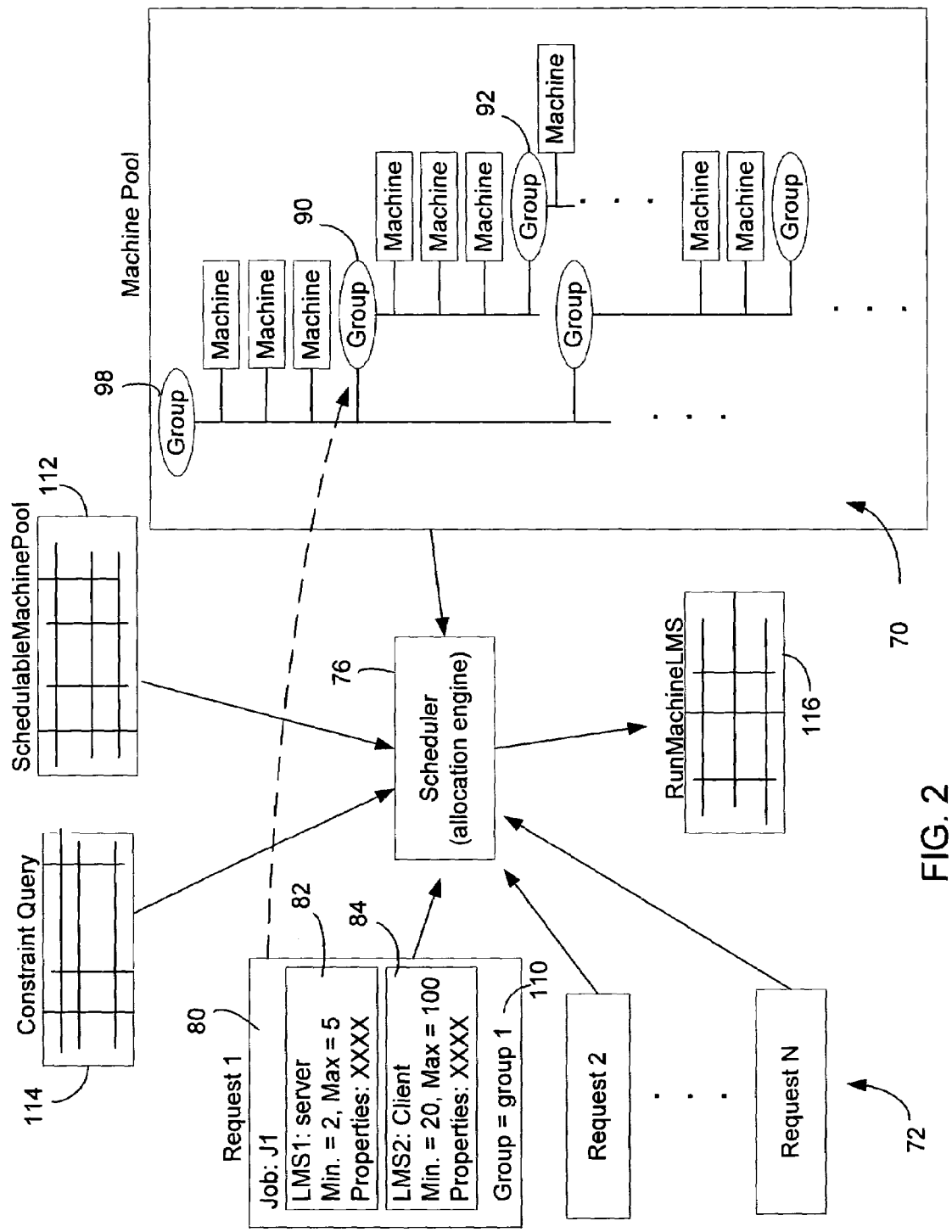
FIG. 2 is a schematic diagram showing an embodiment of the invention in a computer testing framework that has a plurality of test cases and a plurality of available test machines to be allocated by a scheduler for running the test cases.

Referring now to FIG. 2, the present invention is directed to a new method and system for dynamically allocating physical machines 70 in response to requests 72 for the machines. In this context, the machines are the resources to be allocated. There may be many requests, and each request may ask for a plurality of machines and has its own set of specified requirements. There may also be a large number of available machines, each having its own configurations and attributes. The task of resource allocation in response to each request is to find in the machine pool enough machines with the proper properties and configurations that meet the specified requirements of that request, and assign those machines to that request. Moreover, it is necessary to keep track of the states of the machines so that the available machines can be allocated for new requests. In other words, the requests and the status of the machines will be changing with time, and the matching of available machines with the requests has to be dynamically made. An allocation engine that implements the mechanism of the present invention enables the dynamic allocation of the machines to meet the various requests. As will be described in greater detail below, in accordance with the invention, the pool of physical machines are organized into a hierarchical structure with groups and subgroups of machines, and the allocation engine allocates the available machines in response to a request based on the hierarchical structure and the execution permissions associated with the request.

To illustrate by way of example, in the following description, the dynamic machine allocation mechanism of the invention will be described in the context of an embodiment implemented in a computer testing framework. The resources to be allocated are test machines on which tests cases are to be run, and the requests are for getting the test machines needed to run the corresponding test cases. It will be appreciated, however, that the dynamic resource allocation mechanism of the invention is not limited only to computer testing and can be effectively applied to other scenarios for allocating various types or resources.

In the embodiment shown in FIG. 2, the task of dynamically allocating test machines as resources for running different test cases is performed by a scheduler 76 that functions as the resource allocation engine. The scheduler 76 may be invoked at regular time intervals, such as once every minute. Alternatively, the scheduler 76 may be invoked wherever there are a sufficient number of test cases waiting for allocation of test machines for them to run on.

Generally, in the context of testing computer software and hardware, a "task" is a single executable step in a test case. A "job" is a test containing one or more tasks. A "run" contains a sequential list of jobs to be performed$_{[VR2]}$. A "schedule" contains one or more runs. A "group" is logical grouping of physical test machines, while a "subgroup" is a subset of a logical grouping of test machines. These terms will be used in the following description regarding how test machines are allocated for running test cases utilizing the allocation mechanism of the invention.

Typically, each job may require multiple machines with certain configurations, capabilities, or attributes. The required machines may be defined as logical groups that have specific properties. Such a logical grouping of machines is referred to as a "logical machine set" (LMS). Each request may ask for one or more logical machine sets. For instance, a test case for testing client-server interactions relating to certain software components may require a minimum of 2 and a maximum of 5 testing machines to function as servers, and a minimum of 20 and a maximum of 100 test machines to function as clients. Thus, this test case needs two logical machine sets: servers and clients. The request 80 for machines for this test case contains data specifying the two logical machine sets 82 and 84. There may be different requirements for different logical machine sets, depending on the design of the test case. For instance, the request may specify that the server machines should run a particular version of an operating system, while the client should have a particular network security protocol installed thereon. The scheduler 76 is responsible for finding physical test machines that satisfy all the requirements of each logical machine set needed by a test case, as well as other factors such as the permissions of the user who submits the test case to execute the test case on different groups of the test machines.

In accordance with a feature of the invention, the pool of physical test machines 70, which are the resources to be allocated, are organized into a hierarchical structure. As mentioned above, a logical grouping of testing machines is referred to as a "machine group." Each group of machines, such as the group 90, may have individual test machines 92 (called "free pool machines") and subgroups as members of the group, and each subgroup, such as the subgroup 96, may have its own test machines and subgroups. In this regard, a group 90 may be the subgroup of another machine group 98. The grouping of the test machines into the hierarchical structure may be based on various considerations and criteria, and the end user can design the machine pool hierarchy based on the test cases and scenarios. By organizing the machines into a hierarchical structure, the user can better organize the machines to meet different requirements. For instance, the user may create separate groups based on the processor architectures of the machines. The user can schedule jobs at a desired level in the architecture to have better control over which machines are selected in the allocation operation.

Figure 3:
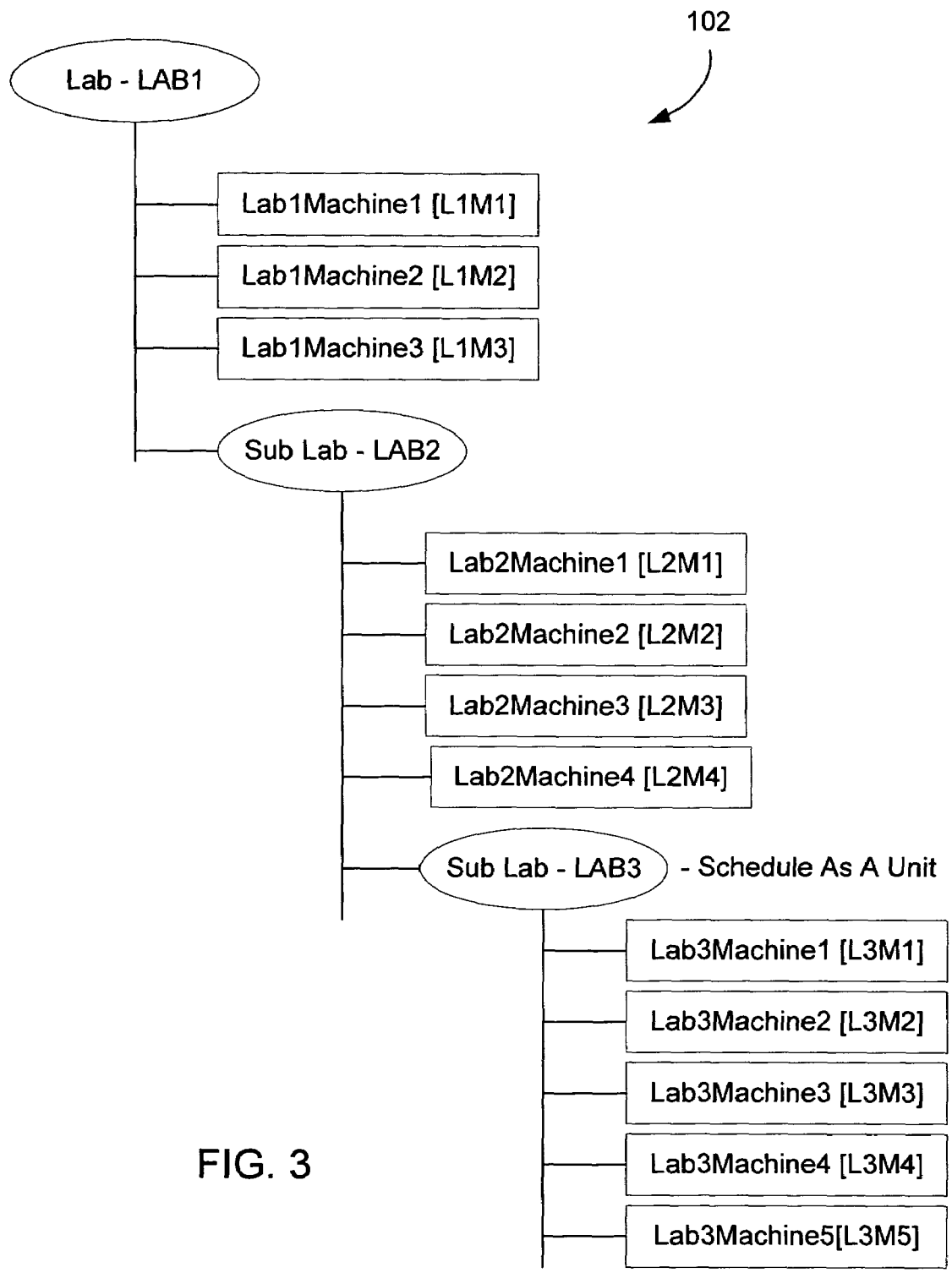
FIG. 3 is a schematic diagram showing as an example a plurality of machines organized in a hierarchical structure for allocation in accordance with the invention.
Figure 4:
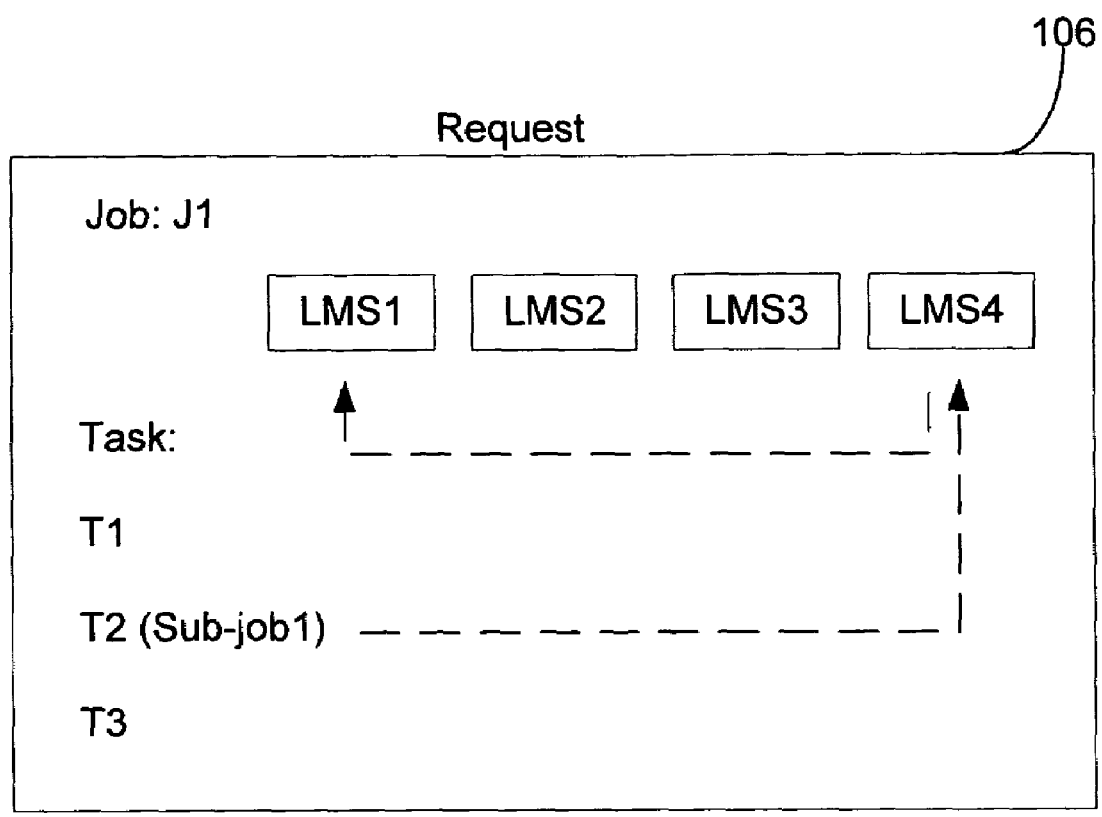
FIG. 4 is a schematic diagram showing a request for a job that has a sub-job.

As an example, FIG. 3 shows a group of test machines organized in a hierarchical structure 102. In this example, the group LAB1 contains machines L1M1, L1M2, L1M3, and a sub-group LAB2. The sub-group LAB2 in turn contains machines L2M1, L2M2, L2M3, and L2M4, and a sub-group LAB3, which contains machines L3M1, L3M2, L3M3, L3M4, and L3M5.

Returning to FIG. 2, the scheduler finds test jobs that need to scheduled based on the schedule start time and try to find test machines in a group in which they should be run. In this regard, instead of allowing a test case to run on any machine in the machine pool 70, each test case is associated with, or confined to, a target group of machines in the hierarchy. The group 90 in which the test case should run may be specified by data 110 in the request 80. In one implementation, a machine group to be used is specified by a schedule, which may contain one or more runs, each of which may in turn contain one or more jobs. Alternatively, the group may be selected by the scheduler 76 based on the user's execute rights or other parameters. As described above, the group in which the job needs to be run may have multiple test machines and subgroups attached to it. The scheduler schedules the job in the machines over which the user submitting the job has execute permission. In one implementation, a table 112 called "SchedulableMachinePool" is used to contain information of all available test machines. Each entry of the table identifies a test machine and has data regarding access permission, status of the machine, and any other data required for the allocation operation. This table is continuously updated to show the current status of each machine, such as whether the machine is currently used for running test cases or is free and can be assigned to new cases, as well as the current configurations of the machines. The scheduler would schedule a run by referencing the data in the SchedulableMachinePool table 110 and selecting test machines from only the machines present in the table. The up-to-date machine information provided by the SchedulableMachinePool table enables the scheduler to dynamically allocate machines that meet the requirements of various request.

In accordance with a feature of a preferred embodiment, each group or sub-group that is a leaf group (i.e., a group that does not contain any subgroup) in the hierarchy may be marked as "Schedule As A Unit$_{[VR6]}$." The effect of this marking is that all the machines in the group or sub-group will be allocated as a unit for a job. The scheduler 76 will assign machines to a job by selecting some machines from a group or sub group if the group or sub-group does not have the "Schedule As A Unit" flag set. If the "schedule as unit" flag of a group is set, however, then all the machines in that group will be reserved exclusively for one run. For instance, returning to the example of FIG. 3, the group LAB3 is marked as "Schedule As A Unit." The scheduler either schedules a job allowed to run in LAB1 by selecting from either the machines L1M1, L1M2, L1M3, L2M1, L2M2, L2M3, L2M4, or the machines L3M1, L3M2, L3M3, L3M4, and L3M5. The schedule would not allocate a combination such as L1M1, L2M1, L3M2 for running a job.

In a preferred embodiment, the scheduler 76 assigns to groups marked as "Schedule As A Unit" a lower priority (or preference) for allocation than the priority given to individual test machines. For example, in the hierarchy of FIG. 3, the scheduler 76 will give the LAB3 group the lower priority for consideration that if one machine in that group is assigned to a run then the entire group will be reserved for that run regardless of how many of the machines in that group will be actually used by the run. Thus, the order in which the scheduler would try to select the physical test machines for the job is first in the machines of LAB1 and LAB2 (i.e., L1M1, L1M2, L1M3, L2M1, L2M2, L2M3, L2M4), and then in the machines of LAB3 (i.e., L3M1, L3M2, L3M3, L3M4, L3M5).

In one implementation, the machine/group allocation based on their respective priorities is achieved by assigning an index called "Grouping Index" to the machines according to their position in the group. To schedule a set of jobs on a given group in the hierarchy, all machines within the group (regardless of the relative hierarchical levels within the group) on which the user has execute permission are given the same grouping index of a first value (e.g., 0), except those machines in subgroups marked as "Schedule As A Unit." If the user has execute permission on one or more machines in the "Schedule As A Unit" subgroups, then the subgroups are given a group index of a second value (e.g., 1) that is higher than the first group index value. Thus, in the example of FIG. 3, the machines L1M1, L1M2, L1M3, L2M1, L2M2, L2M3, L2M4 have a Grouping Index value of 1 and the machines L3M1, L3M2, L3M3, L3M4, L3M5 in the group LAB3 have a grouping index of 2. The scheduler would try to schedule a run by selecting machines based on their Grouping Indices in the ascending order of the indices. In other words, machines with a lower Grouping Index value will be selected over machines with a higher Grouping Index value.

In accordance with another feature of a preferred embodiment, sub-requests may exist in a request, and resource allocation will take this relationship into account. For example, in the context of allocating test computers for test cases, a job may have sub-jobs, and the sub-jobs will use only the resources (test machines) allocated to the parent job. By way of example, consider the following scenario illustrated in FIG. 4: a request 106 for a job J1 requires three logical machine sets LMS1, LMS2, and LM3, and has three tasks T1, T2, and T3. The task T2 corresponds to a sub-job SJ1 and is assigned to run in the logical machine set LMS1 of the job J1. Suppose that the logical set LMS1 has been matched with physical test machines L2M2 and L2M4 of Grouping Index 1. In this case, the scheduler will try to match the logical machine set for the sub-job SJ1 only to testing machines selected from L2M2 and L2M4. This ensures that the sub-job uses only the resources allocated to its parent job.

Figure 5:
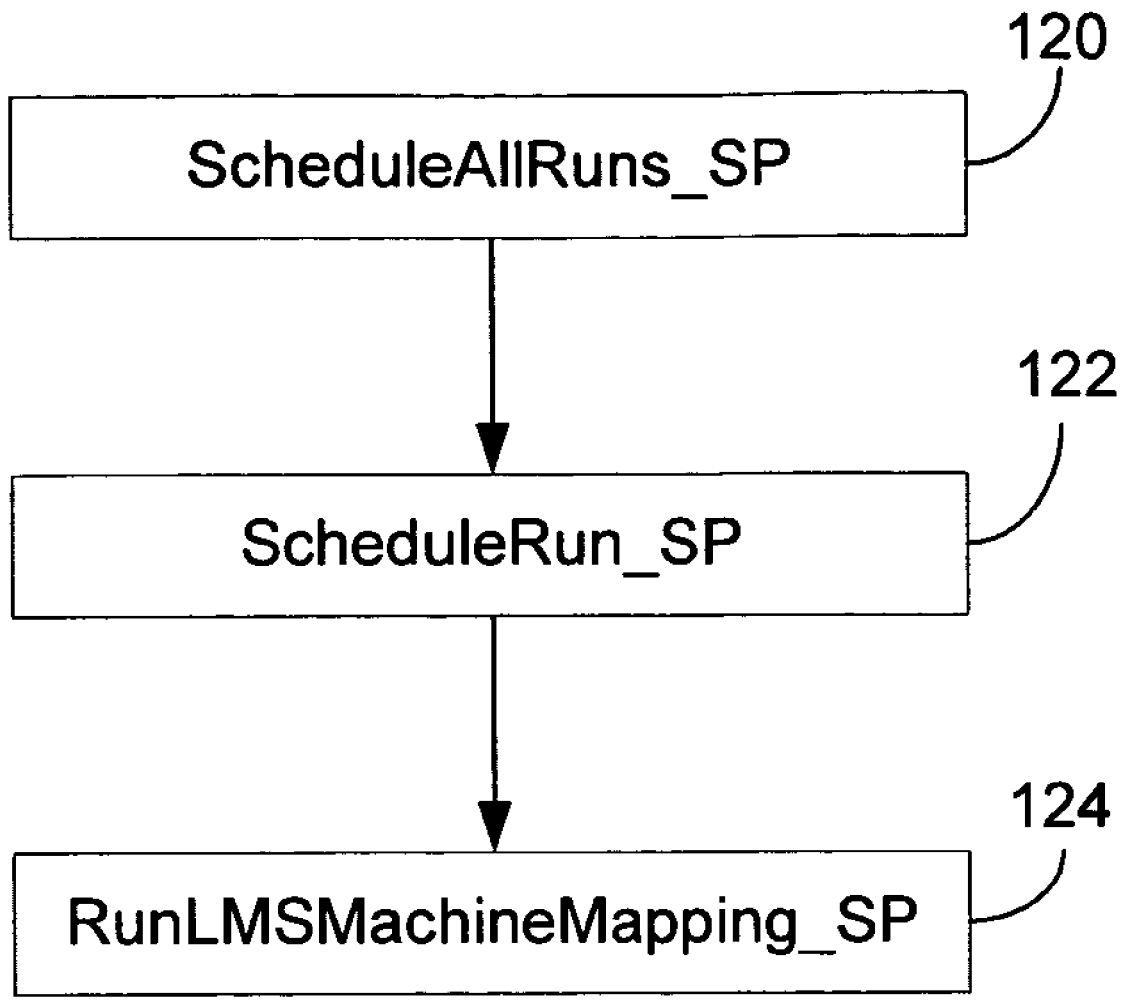
FIG. 5 is a schematic diagram showing the dependency of three program modules of the scheduler of FIG. 2.
Figure 6:
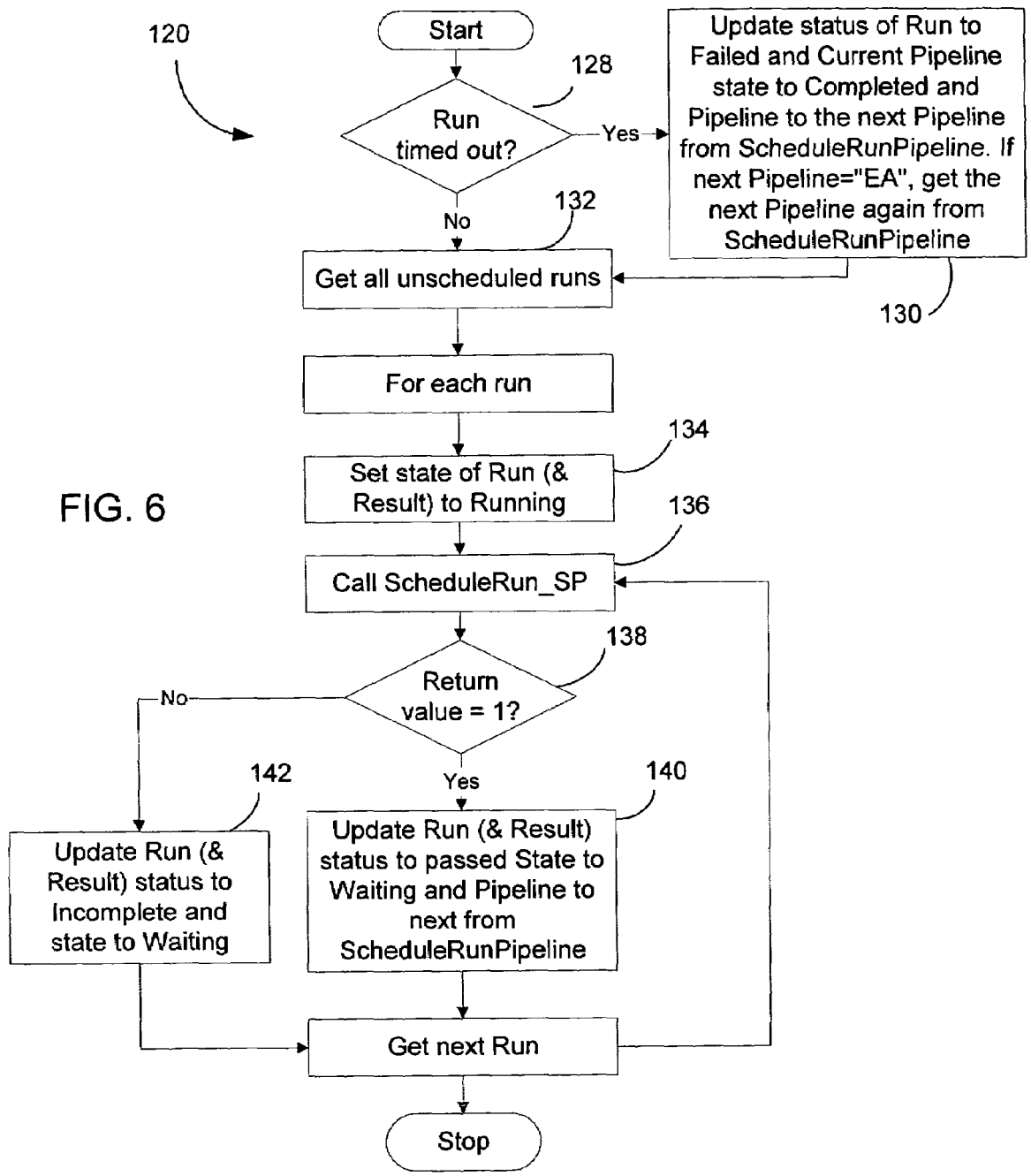
FIG. 6 is a flowchart showing the operation of a first program module of the scheduler.

The operation of the scheduler 76 in a preferred embodiment as shown in FIG. 2 will be described in greater detail below with reference to the dependency diagram of FIG. 5 and flowcharts in FIGS. 6-8. In this embodiment, a "run" is a schedulable unit. As shown in FIG. 5, the scheduler has three function modules: ScheduleAllRuns_SP 120, ScheduleRun_SP 122, and RunLMSMachineMapping_SP 124, that are called to accomplish the task of allocating test machines for running test cases. The operation of the module ScheduleAllRuns_SP 120 is summarized in FIG. 6. The module 120 first checks and updates the status for each unscheduled run (step 128). It sets the state of the allocation operation to "completed" and the run status for "failed" if the run is older than its timeout threshold (step 130). The module then gets all unscheduled runs in the order of their run IDs in ascending order (step 132). Only those runs for which the schedule start time has elapsed will be fetched. The Current Pipeline State of each fetched unscheduled run (and the Results associated with the run) is to "Running" (step 134). For each run, the module ScheduleRun_SP is then called (step 136) to do the allocation, i.e., finding test machines that meet the requirements of the run. If the return value of ScheduleRun_SP for all runs in a run collection is "success" (e.g., the value 0) (step 138), the status of the run is set to "Passed", and the state is set to "Waiting," and the pipeline is set to the next pipeline from the ScheduleRunPipeline for the schedule to which the Run belongs (step 140). Otherwise the status of the run collection is set to "Not Complete," and the state of the allocation operation is set to "Waiting" (step 142).). In this regard, the Status value can be Not Complete, Infrastructure Failure, Failed, Cancelled, or Passed. The State value can be Waiting, Running, Completed, Marked for Cancellation. The combination of these two values describe the progress of the scheduling of the run.

Figure 7:
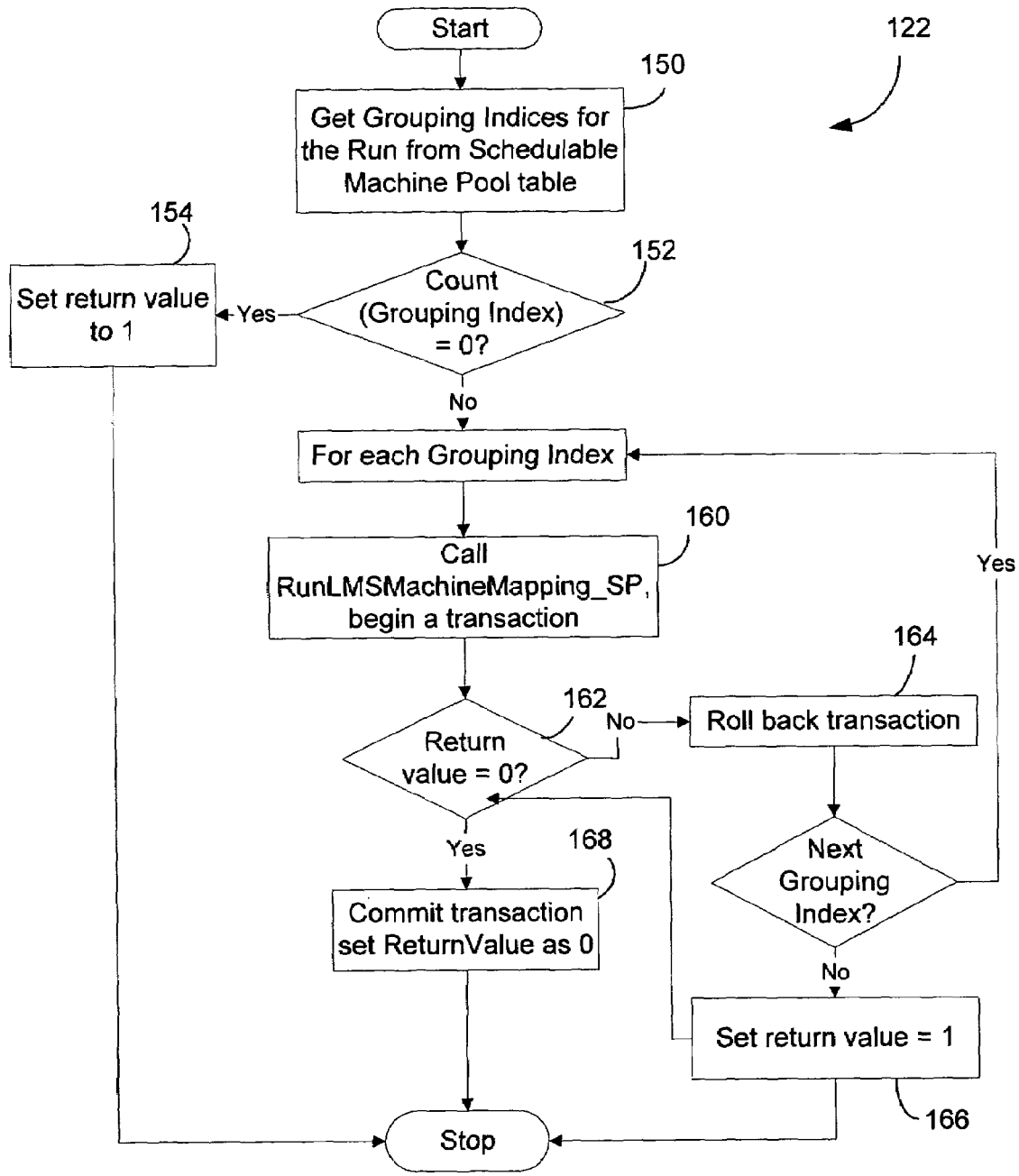
FIG. 7 is a flowchart showing the operation of a second program module of the scheduler.

Turning now to FIG. 7, the ScheduleRun_SP 122 receives the Schedule ID and Run ID as its input parameters. When this module 122 is called, it retrieves the Grouping Indices for the run from the SchedulableMachinePool table 112 (step 150). This will get only those test machines on which the user has execute permission. In the case of groups or sub-groups marked as "Schedule As A Unit," only those groups that are free (i.e., not being reserved for any run) will be retrieved. If there are no Grouping Indices present for the run (step 152), the module logs an error in a Run Error Log to indicate that the user does not have rights to execute the run on the group of test machines, and exits the procedure with a return value of 1 to indicated that the operation has failed (step 154). Otherwise the module performs the following steps for each Grouping Index value in the Indices list. First, for each Run, it begins a transaction and calls the RunLMSMachineMapping_SP for allocating machines for the run (step 160). It then checks the return value of that call (step 162). If the return value from RunLMSMachineMapping_SP is 0 (i.e., Success), the ScheduleRun_SP module commits the transaction and set the Return Value to 0, and exits the procedure (step 168). If, on the other hand, the return value from RunLMSMachineMapping_SP for the run is 1 (i.e., Failure), the ScheduleRun_SP module 124 rolls back the transaction (step 166), and move on to the next Grouping Index value. If the run cannot be scheduled in any of the grouping indices, the ScheduleRun_SP module logs an error in the Run Error log and exits the procedure with a return value of 1 (step 166).

Figure 8:
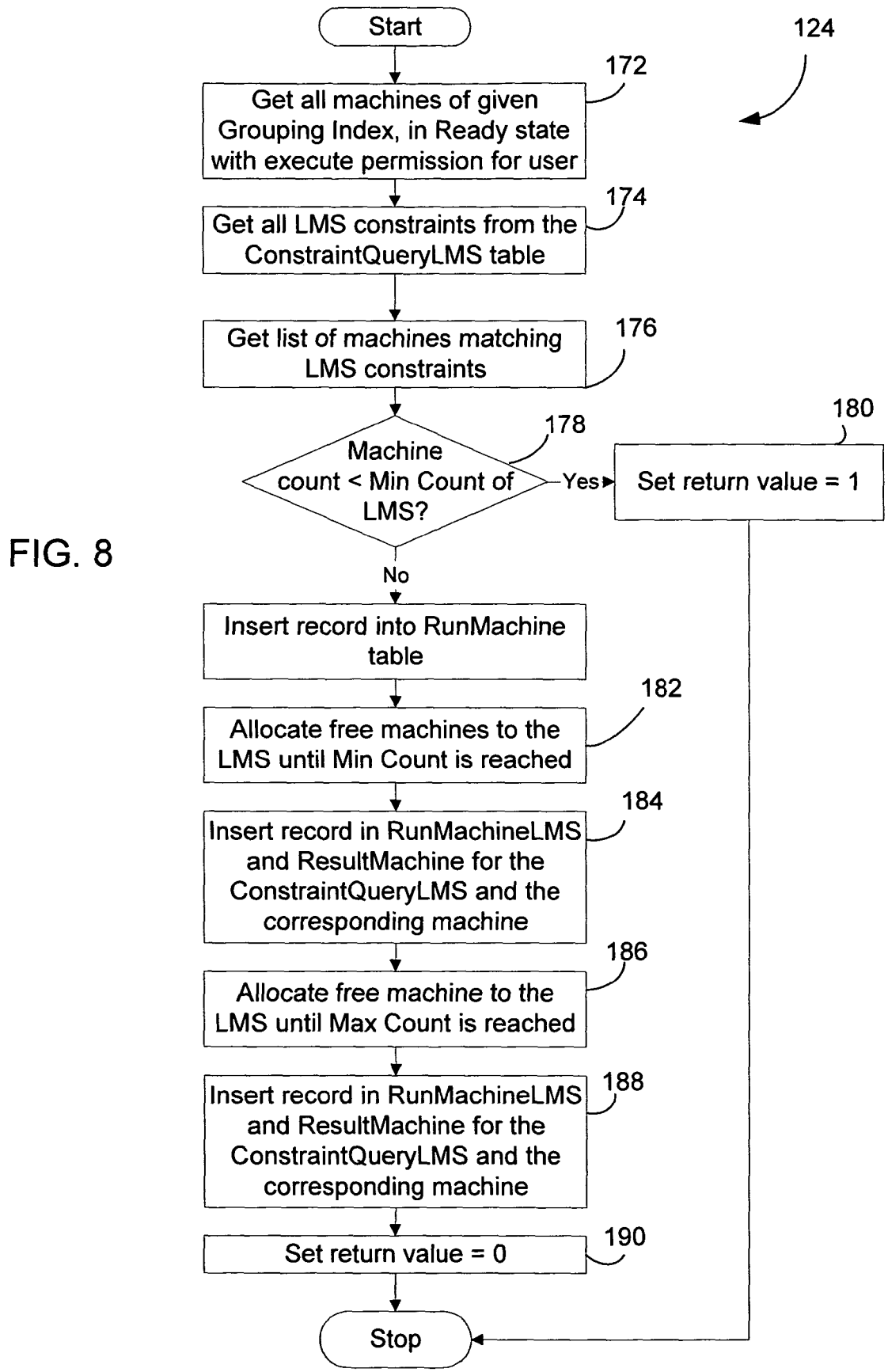
FIG. 8 is a flowchart showing the operation of a third program module of scheduler.

Turning now to FIG. 8, the RunLMSMachineMapping_SP module 124 receives the Schedule ID, Run ID, and the Grouping Index as input parameters. When the module is called, it gets the list of LMS Constraints (i.e., the required properties of the LMS) for the run from the ConstraintQueryLMS table 114 (step 174). If $_{[VR16]}$there are no LMS for the run (i.e., the run has no specified requirements), the first available machine is reserved for the run, and the module exits the procedure with a return value of 0. Otherwise, the module gets all the test machines with the given grouping index value, whose status is "Ready" and the Last Updated time is less than 30 minutes and for which the user has execute permission from the LMS Machines Mapping table (step 172). In the case of sub-jobs, only the machines satisfying the parent job's LMS requirements are considered.

As mentioned above, each LMS typically specifies a minimum number ("Min Count") and maximum number ("Max Count") of machines that are needed for running the test. If the number of matching testing machines obtained is less than the Min Count for any of the LMS of the run (step 178), the module sets the return value to 1 (180). Otherwise, the test machines found for the LMS are inserted in a temporary table. For each LMS being scheduled, the module creates an inner loop of accessible machines in the list of obtained machines. This is for allocating machines according to the Min Count of the LMS. A test machine is allocated to that LMS if it has not been reserved by other LMS's of the run. The module sets the status of the allocated machine to "Running" and increment the count of reserved machines for the LMS, and inserts a record into the RunMachineLMS table 116 for RunMachineID and the MachineID for the ConstraintQueryLMSID, and inserts a record in the ResultMachine table for the LMS and MachineIDs. (step 184). The Module then checks whether the Min Count of the LMS is satisfied. After the minimum number of test machines have been found for each of the LMS's (step 182), the module sets the return value to 0. It then create for each LMS an inner loop of accessible machines in the list of available machines for reserving more machines for the LMS up to the Max Count of the LMS. The module goes through the loop, and checks the properties of each machine. If it meets all the requirements of the LMS, the status of the machine is set to "Running", and the count of reserved machine is incremented. This continues until the Max Count is met or until it has reached the end of the loop (step 186). The module updates the record in the RunMachineLMS table for the RunMachineID and the MachineID for the ConstraintQueryLMSID, and inserts a record into the ResultMachine table for the LMS and Machine IDs (step 188). After the module has gone through the loop for all the LMS's, it exits the procedure with a return value of 0 (step 190).

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps for designating computers in a computer pool to execute a test job comprising a set of programmed instructions, the steps comprising:
    organizing the computers in the computer pool into one or more logical groups, at least one of the logical groups comprising one or more logical subgroups of computers, each computer in the one or more logical groups and subgroups satisfying at least one criterion;
    receiving a request for computers to execute a test job, the request specifying a plurality of logical machine sets and, for each logical machine set, (1) a quantity of required computers in the logical machine set, the quantity being specified as a range between a minimum and a maximum, the minimum being greater than two, and (2) requirements, for the required computers, including but not limited to a configuration characteristic needed to perform the test job;
    identifying a target group of computers to satisfy the requirements from among the one or more groups of computers in the computer pool, the target group comprising a first subgroup of computers to be allocated as a unit, the first subgroup comprising at least three computers;
    selecting, from the target group, computers to comprise each logical machine set; and
    designating the selected computers to perform the test job;
    wherein the test job comprises a sub-job, and wherein the designating comprises designating the first subgroup to perform the sub-job.

2. A computer-readable medium as in claim 1, wherein the step of selecting includes referencing a data structure containing up-to-date information about availability and configurations of the computers in the target group for determining whether the computers meet the requirements of the logical machine set.

3. A computer-readable medium as in claim 2, having further computer-executable instructions for performing the step of updating the information in the data structure.

4. A computer-readable medium as in claim 1, having further computer-executable instructions for determining whether a schedule start time for the request has elapsed.

5. A system comprising:
    a computer pool having a plurality of computers organized into one or more logical groups, at least one of the logical groups comprising one or more logical subgroups of computers, each computer in the one or more logical groups and subgroups satisfying at least one criterion;
    an allocation engine for designating computers in the computer pool to execute a test job comprising a set of programmed instructions in response to a request to use computers in the computer pool, the request specifying a plurality of logical machine sets and, for each logical machine set, (1) a quantity of required computers in the logical machine set, the quantity being specified as a range between a minimum and a maximum, the minimum being greater than two, and (2) requirements, for the required computers, including but not limited to a configuration characteristic needed to perform the test job, the allocation engine being programmed to identify a target group of computers, comprising a first subgroup of computers to be allocated as a unit, the first subgroup comprising at least three computers, to satisfy the requirements from among the one or more groups of computers in the computer pool to select from the target group computers to comprise each logical machine set, and to designate the selected computers to perform the test job, wherein the test job comprises a sub-job, and wherein the designating comprises designating the first subgroup to perform the sub-job.

6. A system in claim 5, further including a data structure containing up-to-date information of availability and configurations of the computers in the target group, and wherein the allocation engine accesses the data structure for determining whether the computers in the target group meet the requirements of the logical machine set.

7. A method of designating computers in a computer pool to execute a test job comprising a set of programmed instructions, comprising:
    organizing the computers in the computer pool into one or more logical groups, at least one of the logical groups comprising one or more logical subgroups of computers, each computer in the one or more logical groups and subgroups satisfying at least one criterion;
    receiving a request for computers to execute a test job, the request specifying a plurality of logical machine sets and, for each logical machine set, (1) a quantity of required computers in the logical machine set, the quantity being specified as a range between a minimum and a maximum, the minimum being greater than two, and (2) requirements, for the required computers, including but not limited to a configuration characteristic needed to perform the test job;
    identifying a target group of computers to satisfy the requirements from among the one or more groups of computers in the computer pool, the target group comprising a first subgroup of computers to be allocated as a unit, the first subgroup comprising at least three computers;
    selecting, from the target group computers to comprise each logical machine set; and
    designating the selected computers to perform the test job;
    wherein the test job comprises a sub-job, and wherein the designating comprises designating the first subgroup to perform the sub-job.

8. A method as in claim 7, wherein the step of selecting including referencing a data structure containing up-to-date information about availability and configurations of the computers in the target group for determining whether the computers meet the requirements of the logical machine set.

9. A method as in claim 8, further including the step of updating the information in the data structure.

10. A method as in claim 7, further including the step of determining whether a schedule start time for the request has elapsed.

* * * * *